US009108694B2

(12) United States Patent
Chen et al.

(10) Patent No.: US 9,108,694 B2
(45) Date of Patent: Aug. 18, 2015

(54) BICYCLE FITTING METHOD FOR PRODUCING BICYCLE, BICYCLE FITTING SYSTEM AND COMPUTER PROGRAM PRODUCT

(75) Inventors: Chien-Hung Chen, Miaoli County (TW); Wei-Chieh Ho, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 125 days.

(21) Appl. No.: 13/481,869

(22) Filed: May 28, 2012

(65) Prior Publication Data

US 2012/0323351 A1    Dec. 20, 2012

(30) Foreign Application Priority Data

Jun. 14, 2011    (TW) .............................. 100120724 A (51) Int. Cl.
| | |
|---|---|
| *G05B 9/02* | (2006.01) |
| *G05B 13/02* | (2006.01) |
| *G06F 19/00* | (2011.01) |
| *G06G 7/48* | (2006.01) |
| *G06F 17/50* | (2006.01) |
| *B62K 19/00* | (2006.01) |

(52) U.S. Cl.
CPC ..................................... *B62K 19/00* (2013.01)

(58) Field of Classification Search
CPC ................... G06F 17/30398; G06F 17/30646; G06F 17/30705; G06F 17/30731; G06F 17/30734; G06F 17/30864; G06F 17/289; G06F 17/30595; G06F 17/30669; G06F 17/3069; Y10S 707/99933; Y10S 707/99945; B62K 19/00

USPC .................. 700/31, 97, 98, 182; 703/6, 7, 16
See application file for complete search history.

(56) References Cited

U.S. PATENT DOCUMENTS

| | | | |
|---|---|---|---|
| 5,269,551 A | | 12/1993 | Martin et al. |
| 5,364,271 A | * | 11/1994 | Aknin et al. ..................... 434/61 |
| 5,417,311 A | * | 5/1995 | Musco, III ................. 188/24.21 |
| 5,624,519 A | | 4/1997 | Nelson et al. |
| 6,270,104 B1 | | 8/2001 | Nelson et al. |

(Continued)

FOREIGN PATENT DOCUMENTS

| | | |
|---|---|---|
| CN | 2551560 | 5/2003 |
| EP | 0945333 | 9/1999 |

(Continued)

OTHER PUBLICATIONS

Henri et al., "Comfort on Bicyles and the Validity of a Commercial Bicycle Fitting System", Elsevier, 1998, 201-211.*

(Continued)

*Primary Examiner* — Robert Fennema
*Assistant Examiner* — Thomas Stevens
(74) *Attorney, Agent, or Firm* — Jianq Chyun IP Office (57) ABSTRACT

A bicycle fitting method for producing a bicycle is provided. The method includes the steps of receiving a bicycle riding information and a body measurement corresponding to a cyclist. According to the bicycle riding information, a bicycle model is provided. According to the body measurement and the selected bicycle model, a bicycle frame size and a set of bicycle geometric adjustment parameters are provided. According to the bicycle model, the bicycle frame size, and the set of bicycle geometric adjustment parameters, a bicycle which fits the cyclist is produced.

16 Claims, 8 Drawing Sheets

(56) References Cited

U.S. PATENT DOCUMENTS

| | | | |
|---|---|---|---|
| 7,149,665 B2* | 12/2006 | Feld et al. | 703/2 |
| 7,386,482 B2 | 6/2008 | Kokatsu et al. | |
| 8,103,665 B2* | 1/2012 | Abbott et al. | 707/729 |
| 2002/0055422 A1* | 5/2002 | Airmet et al. | 482/61 |
| 2002/0083025 A1* | 6/2002 | Robarts et al. | 706/12 |
| 2005/0246152 A1* | 11/2005 | Kokatsu et al. | 703/22 |
| 2007/0003910 A1 | 1/2007 | Kirila | |
| 2007/0142177 A1* | 6/2007 | Simms et al. | 482/8 |
| 2010/0051280 A1* | 3/2010 | Akram | 166/303 |
| 2010/0306160 A1 | 12/2010 | Simms | |
| 2010/0332304 A1* | 12/2010 | Higgins et al. | 705/14.16 |
| 2011/0077125 A1 | 3/2011 | Kenyon | |

FOREIGN PATENT DOCUMENTS

| | | |
|---|---|---|
| GB | 2252537 | 8/1992 |
| TW | M343630 | 11/2008 |

OTHER PUBLICATIONS

Nielens et al., "Bicycle Shock Absorption Systems and Energy Expanded by the Cyclist", Sports Medicine 2004, pp. 71-80.*

Duc et al., "Muscular Activity During Uphill Cycling: Effect of Slope, Posture, Hand Grip Position and Constrained Bicycle Lateral Sways", Science Direct, 2008, pp. 116-127.*

"Search Report of Europe Counterpart Application", issued on Sep. 11, 2012, p. 1-p. 5, in which the listed references were cited.

"First Office Action of China counterpart application" issued on Aug. 13, 2013, p. 1-p. 10, in which the listed references were cited, 10 pages.

"Office Action of Australian Counterpart Application", issued on Apr. 12, 2013, p. 1-p. 6, in which the listed reference was cited.

"Competitive Cyclist Fit Calculator," Jun. 19, 2004, available at: http://www.competitivecyclist.com/pdf/fit_details.pdf.

"Office Action of Australia Counterpart Application", issued on Dec. 8, 2014, p. 1-p. 5, in which the listed references were cited.

* cited by examiner

FIG. 1

| Ride Surface / Ride Intensity | Asphalt Road Surface | Mixed Road Surface | Sandstone Road Surface |
|---|---|---|---|
| Competition Level | TCR<br>Trinity<br>Omniu<br>Defy | TCX | XTC Glory<br>Antherr Reign<br>Trance Faith<br>STP |
| Professional Level | FCR<br>Rapid<br>MR4<br>CHIRON<br>Escaoe | ROAM<br>NANA<br>ALIES | TALON |
| Standard Level | Bowery, Seek, Clip,<br>Halfway, TranSend,<br>Cypress, Suede,<br>Simple, Twist, Flight | Sedona<br>SEEK<br>JOLLIOR | Boulder<br>Revel |

FIG. 1A

| Ride Surface / Ride Intensity | Asphalt Road Surface | Mixed Road Surface | Sandstone Road Surface |
|---|---|---|---|
| Competition Level | 40–50° | 42–46° | 50–55° |
| Professional Level | 50–60° | 50–60° | 50–60° |
| Standard Level | 55–70° | 60–70° | 55–60° |

…
BICYCLE FITTING METHOD FOR PRODUCING BICYCLE, BICYCLE FITTING SYSTEM AND COMPUTER PROGRAM PRODUCT

CROSS-REFERENCE TO RELATED APPLICATION

This application claims the priority benefit of Taiwan application serial no. 100120724, filed on Jun. 14, 2011. The entirety of the above-mentioned patent application is hereby incorporated by reference herein and made a part of this specification.

BACKGROUND OF THE INVENTION

1. Field of the Invention

The invention relates generally to a bicycle, and more particularly, to a bicycle fitting method for producing a bicycle, a bicycle fitting system, and a computer program product.

2. Description of Related Art

In cycling races, in order to maximize the athlete's endurance together with the bicycle in operation, a so-called bicycle fitting technique has been developed. By fitting the bicycle, the variable modules of the bicycle may be adjusted in accordance with the athlete's physique and movements to a most suitable riding posture. The early bicycle fitting techniques were applied only in cycling races. However, with the growth of popularity in the sport of cycling, more and more consumers are beginning to treat bicycle riding as a leisure sport. The need for bicycle fitting has increased day by day, and consumers can now enjoy bicycle fitting services for a fee.

The target audience of the conventional bicycle fitting service is the consumer who have the need for fitting, in order to adjust the variable modules of the bicycle to the most suitable riding posture according to the their physique and movements. However, after the entire process of the bicycle fitting service, if the original size of the bicycle in combination with the variable modules still cannot be adjusted to the most suitable riding posture of the consumer according to their physique and movements thereof, the bicycle fitting service would have been wasted. Therefore, the fitting process should be systematic and logic. Moreover, in order to meet the target riding posture, the variable modules should be forcedly made to match each other, such as a stem whose length should match the bicycle geometry. Otherwise, it results in deficiencies such as the decrease in control sensitivity and the unfavorable overall aesthetics of the bicycle.

Another inherent deficiency of the conventional bicycle fitting service is the emphasis on specialized knowledge. During the fitting process, the consumer is unable to understand the underlying knowledge and principles behind the fitting. Therefore, even it measures many items on body and undergoing a long period of adjustment, the final fitting result is still be not satisfied and convincible. The reason is that consumer and the bicycle are both treated as machines and lack of the concerning on different riding style.

Moreover, the target audience for the conventional bicycle fitting service is the consumer and the bicycle model thereof which had been pre-selected. However, during the early consultation stages of the conventional bicycle fitting service, the pre-selected bicycle model may not match the consumer's needs. Therefore, the bicycle fitting service is interrupted, and the consumer must repurchase a bicycle model which suits the consumer.

SUMMARY OF THE INVENTION

The invention provides a bicycle fitting method for producing a bicycle, capable of rapidly producing a bicycle most suitable for the riding style and the body measurement of a cyclist.

The invention provides a bicycle fitting system capable of producing a bicycle most suitable for the cyclist, by providing the cyclist with the most suitable bicycle model, bicycle frame size, and the bicycle geometric adjustment according to the bicycle riding information of the cyclist.

The invention provides a computer program product capable of providing the cyclist with the most suitable bicycle model, bicycle frame size, and the bicycle geometric adjustment parameters of the bicycle according to the bicycle riding information of the cyclist.

The invention provides a bicycle fitting method for producing a bicycle, including receiving a bicycle riding information and a body measurement corresponding to a cyclist. A bicycle model according to the bicycle riding information is selected. A bicycle frame size and a set of bicycle geometric adjustment parameters according to the body measurement and the selected bicycle model are provided. A bicycle which fits the cyclist is generated according to the bicycle model, the bicycle frame size, and the set of bicycle geometric adjustment parameters.

According to an embodiment of the invention, in the bicycle fitting method, the bicycle riding information includes a ride frequency, a ride distance, and a ride duration.

According to an embodiment of the invention, in the bicycle fitting method, the step of providing the bicycle model according to the bicycle riding information includes analyzing the bicycle riding information to determine a riding style of the cyclist, in which the riding style includes a riding environment and a riding intensity parameter.

According to an embodiment of the invention, in the bicycle fitting method, the ride surface parameter includes an asphalt road surface condition, a sandstone road surface condition, and a mixed road surface condition.

According to an embodiment of the invention, in the bicycle fitting method, the riding intensity parameter includes a standard level, professional level and a competition level.

According to an embodiment of the invention, in the bicycle fitting method, the body measurement includes at least a crotch inseam height and a body height.

According to an embodiment of the invention, in the bicycle fitting method, the step of producing the bicycle fitting the cyclist according to the bicycle model, the bicycle frame size, and the set of bicycle geometric adjustment includes providing a bicycle body which matches the selected bicycle model and the bicycle frame size. At least one variable module of the bicycle body is adjusted according to the set of bicycle geometric adjustment parameters. A measure device is used to measure a upper body angle and a lower body angle of the cyclist riding on the bicycle body. The bicycle body is fine tuned to the bicycle which fits the cyclist according to the upper body angle and the lower body angle.

According to an embodiment of the invention, in the bicycle fitting method, it includes at least one variable module includes a seat, a seat post, a seat tube, a crank, a stem, a handlebar and washeres.

According to an embodiment of the invention, in the bicycle fitting method, fine tuning the bicycle body includes adjusting crank length, handlebar width, stem length, washer height, seat angle, seat height, and distance from seat tip to handlebar on the bicycle body.

The invention provides a bicycle fitting system including a receive module, a search module, and an assembly platform. The receive module receives a bicycle riding information and a body measurement from a cyclist. The search module searches for a bicycle model in a bicycle body database according to the bicycle riding information, and the search module searches for a proper bicycle frame size and a set of bicycle geometric adjustment parameters in the bicycle body database according to the body measurement and the bicycle model. The assembly platform assembles a bicycle which fits the cyclist according to the bicycle model, the bicycle frame size, and the set of bicycle geometric adjustment.

According to an embodiment of the invention, in the bicycle fitting system, the bicycle riding information includes a ride frequency, a ride duration, and a ride distance.

According to an embodiment of the invention, in the bicycle fitting system, the search module includes a search module analyzing the bicycle riding information to determine a riding style of the cyclist, in which the riding style includes a riding environment and a riding intensity parameter.

According to an embodiment of the invention, in the bicycle fitting system, the ride surface parameter includes an asphalt road surface condition, a sandstone road surface condition, and a mixed road surface condition.

According to an embodiment of the invention, in the bicycle fitting system, the riding intensity parameter includes a standard level, a professional level, and a competition level.

According to an embodiment of the invention, in the bicycle fitting system, the bicycle body database records riding environment-riding intensity parameter combinations, and each of the riding environment-riding intensity parameter combinations corresponds to at least one bicycle model.

According to an embodiment of the invention, in the bicycle fitting system, the body measurement includes at least a crotch inseam height and a body height.

According to an embodiment of the invention, in the bicycle fitting system, the assembly platform includes a simulator, a setting module, a measurement device, and a fine tune module. The simulator provides a bicycle body which matches the selected bicycle model and the bicycle frame size. The setting module adjusts at least one variable module of the bicycle body according to the set of bicycle geometric adjustment. The measure device measures a upper body angle and a lower body angle of the cyclist riding on the bicycle body. The fine tune module fine tunes the bicycle body into the bicycle which fits the cyclist according to the upper body angle and the lower body angle.

According to an embodiment of the invention, in the bicycle fitting system, the at least one variable module includes a seat, a seat post, a seat tube, a crank, a stem, a handlebar, and washeres.

According to an embodiment of the invention, in the bicycle fitting system, fine tuning the bicycle body includes adjusting crank length, stem length, washer height, handlebar width, seat angle, seat height, and the distance from seat tip to handlebar on the bicycle body.

The invention provides a computer program product loaded in a computer to execute the following steps. A bicycle riding information and a body measurement from a cyclist are received. A bicycle model is searched in a bicycle body database according to the bicycle riding information. A bicycle frame size and a set of bicycle geometric adjustment are calculated from the bicycle body database according to the body measurement and the found bicycle model.

According to an embodiment of the invention, in the computer program product, the bicycle riding information includes a ride frequency, a ride duration, and a ride distance.

According to an embodiment of the invention, in the computer program product, the step of providing the bicycle model according to the bicycle riding information includes analyzing the bicycle riding information to determine a riding style of the cyclist, in which the riding style includes a riding environment and a riding intensity parameter.

According to an embodiment of the invention, in the computer program product, the ride surface parameter includes an asphalt road surface condition, a sandstone road surface condition, and a mixed road surface condition.

According to an embodiment of the invention, in the computer program product, the riding intensity parameter includes a standard level, a professional level, and a competition level.

According to an embodiment of the invention, in the computer program product, the bicycle body database records riding environment-riding intensity parameter combinations, and each of the riding environment-riding intensity parameter combinations corresponds to at least one bicycle model.

According to an embodiment of the invention, in the computer program product, the body measurement includes at least a crotch insaem height and a body height.

According to embodiments of the invention, the bicycle product suitable for the cyclist can be rapidly selected among the product lines or bicycle models in accordance with the bicycle riding information of the cyclist. Thereafter, according to the body measurement of the cyclist and the selected bicycle model, the bicycle frame size and the set of bicycle geometric adjustment suitable for riding are accurately calculated. According to the set of calculated bicycle geometric adjustment and further fine tuning, the customized bicycle most suitable for the cyclist can be rapidly obtained.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
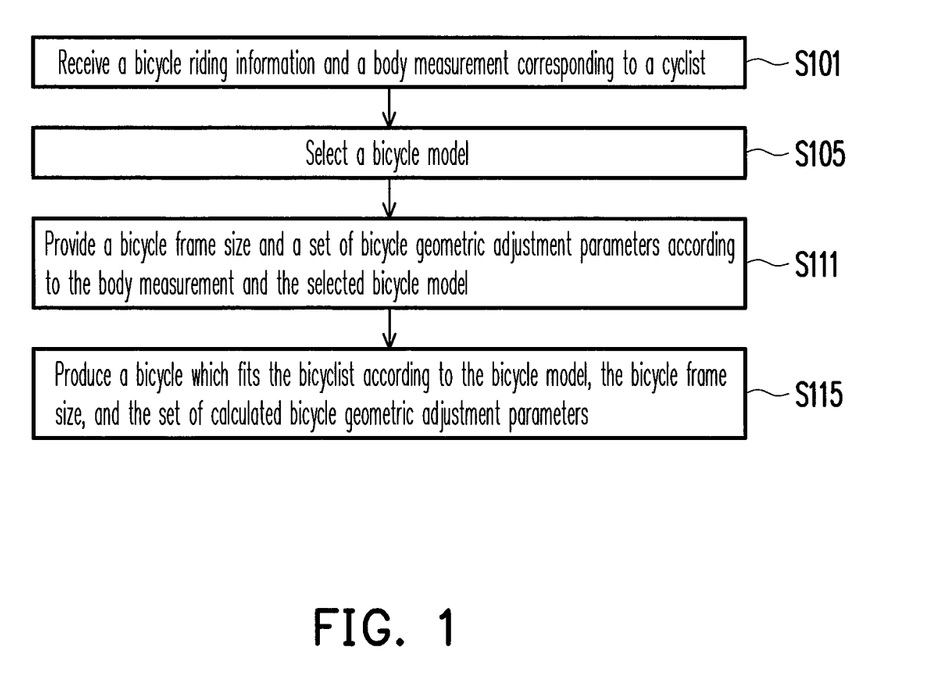
FIG. 1 is a simplified flow chart of a bicycle fitting method for producing a bicycle according to an embodiment of the invention.

FIG. 1 is a simplified flow chart of a bicycle fitting method for producing a bicycle according to an embodiment of the invention. Referring to FIG. 1, in the Step S101, a bicycle riding information and a body measurement from a cyclist are received. The bicycle riding information includes a ride frequency, a ride distance, and a ride duration. In another embodiment, the bicycle riding information includes the age of the cyclist, the years of cycling experience, the previous bicycle models, the body flexibility, the history of injuries and health conditions of the cyclist. In this step, the bicycle riding information and the body measurement could be received at the same time, or separately Additionally, the body measurement is used to differentiate the feature between individuals, and the body measurement includes a crotch inseam height and a body height of the cyclist. The crotch inseam height is used to calculate a seat height, while the body height is used to calculate a bicycle frame size.

Figure 1A:
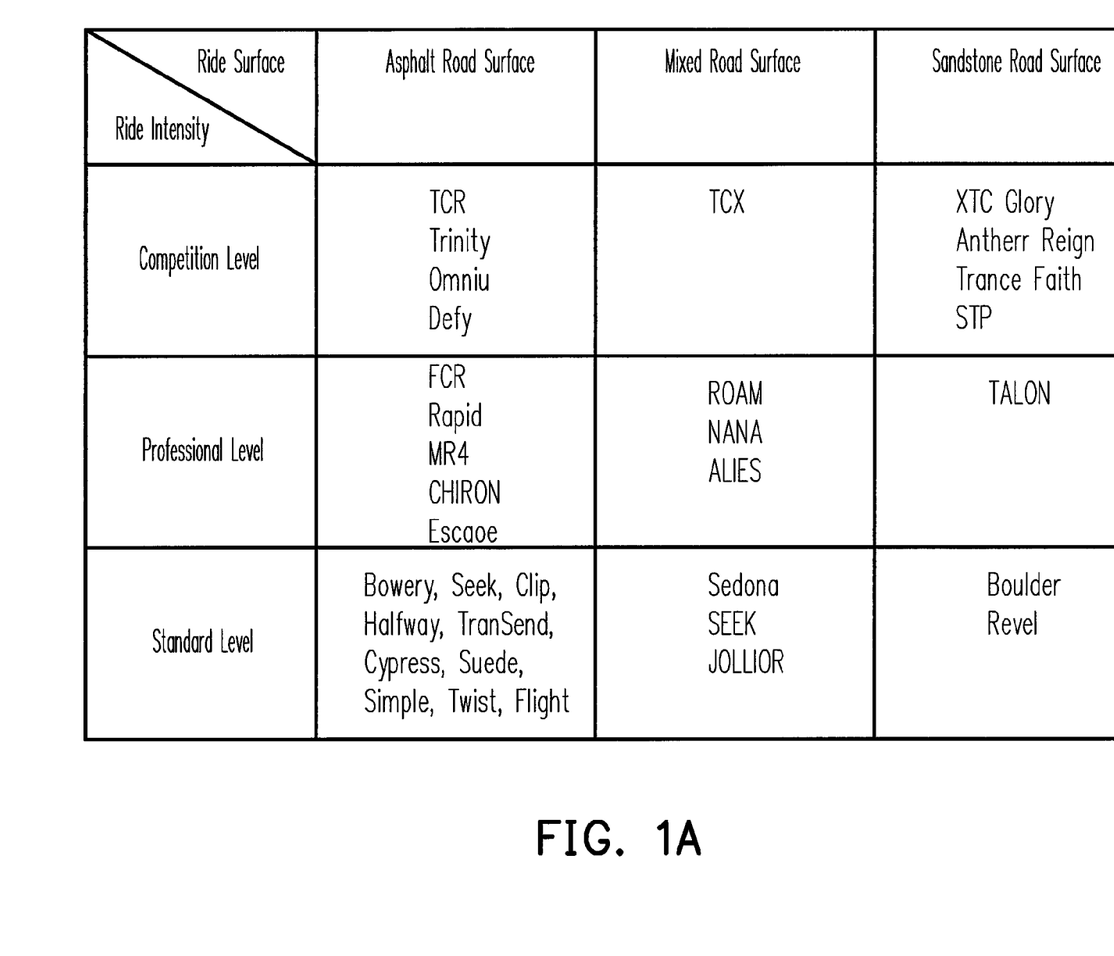
FIG. 1A is a simplified schematic diagram of the ride surface parameter-riding intensity parameter combinations in a bicycle database corresponding to at least one bicycle model according to an embodiment of the invention.

Next, in the Step S105, a bicycle model according to the bicycle riding information is selected. In another embodiment of the invention, the Step S105 further includes analyzing the received riding information to determine a riding style of the cyclist. It should be noted that, the riding style includes a ride surface parameter and a riding intensity parameter. More specifically, the ride surface parameter includes an asphalt road surface condition, a sandstone road surface condition, and a mixed road surface condition. Moreover, the riding intensity parameter includes a standard level, a professional level, and a competition level. Moreover, analyzing the received bicycle riding information to categorize the corresponding riding style of the cyclist. Thereafter, according to the riding style of the cyclist, a bicycle model corresponding to the riding style is determined in a bicycle body database. In another embodiment, the bicycle body database records the riding environment-riding intensity parameter combinations, and each of the riding environment-riding intensity parameter combinations corresponds to at least one bicycle model. The bicycle model could be a mountain bike, a road bike, a track bike, a tour bike, a racing bike, a trick bike, a doubles bicycle, and a female bicycle. FIG. 1A is a simplified schematic diagram of the riding environment-riding intensity parameter combinations in the bicycle body database corresponding to at least one bicycle model according to an embodiment of the invention.

Figure 1B:
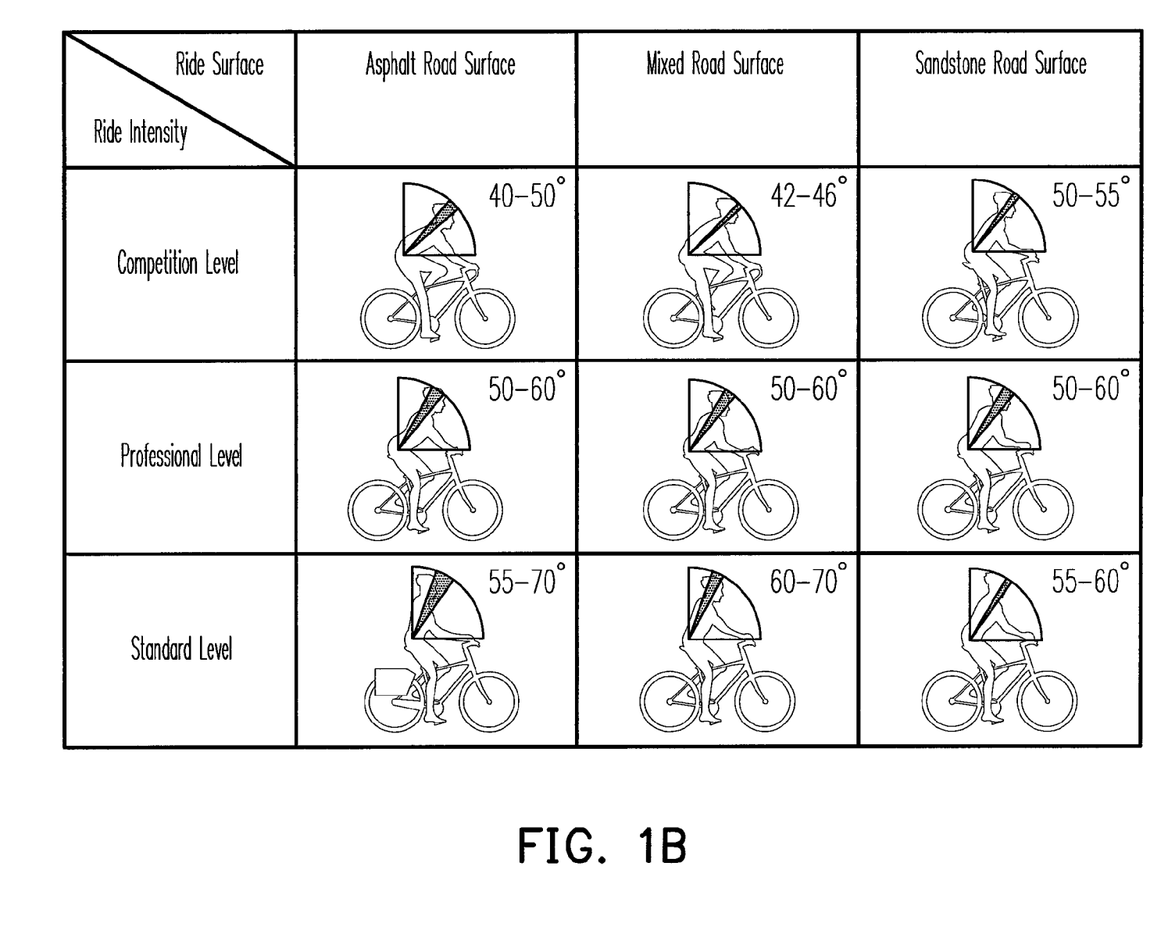
FIG. 1B is a simplified schematic diagram of a target riding posture of different bicycle models corresponding to the riding environment-riding intensity parameter combinations according to an embodiment of the invention.

Next, in the Step S111, a bicycle frame size and a set of bicycle geometric adjustment according to the body measurement and the bicycle model are provided. The bicycle frame size could be a XXS, XS, S, M, ML, L, XL or other specified combinations of frame sizes. In addition, the bicycle frame size of the selected bicycle model suitable for the cyclist is determined by searching a bicycle body database according to the body measurement. The bicycle body database further includes a bicycle frame geometric data, a bicycle handlebar specification, a stem specification, and a crank specification. Moreover, according to the body measurement and the bicycle frame size of the cyclist, a set of customized bicycle geometric adjustment of a bicycle frame size that is exclusive to the cyclist is calculated. In another embodiment, the bicycle database further includes a target riding posture corresponding to each of the selected bicycle models and each of the riding style. Using body measurement to calculate bicycle frame size and proper bicycle geometric adjustment on this size is exclusive to the cyclist and includes a target riding posture corresponding to the selected bicycle model. FIG. 1B is a simplified schematic diagram of a target riding posture of different bicycle models corresponding to the riding environment-riding intensity parameter combinations according to an embodiment of the invention. According to the different riding environment-riding intensity parameter combinations, the different bicycle models correspond to different target riding postures and the corresponding upper body angular range is provided.

Figure 2:
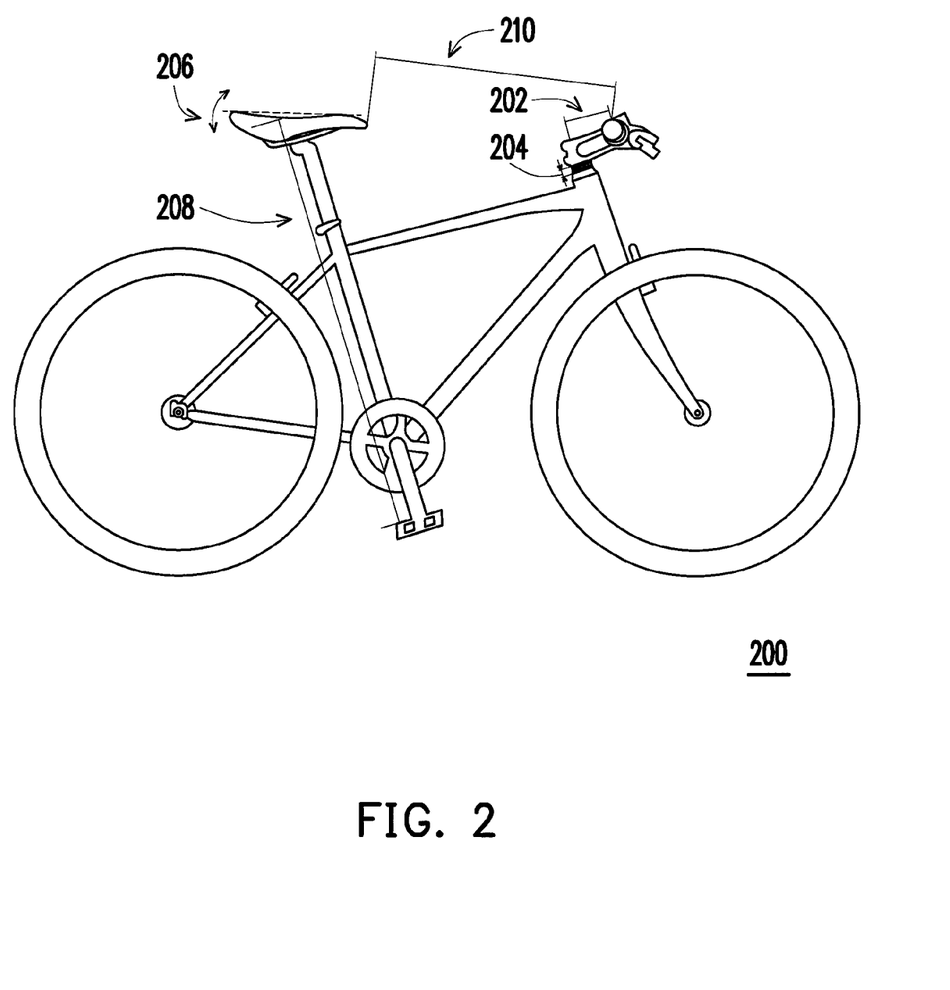
FIG. 2 illustrates a bicycle body to depict a set of bicycle geometric adjustment parameters according to an embodiment of the invention.

The target riding posture could be determined by a upper body angle and a lower body angle, and the angles depend on different riding style. In one embodiment, as shown in FIG. 2, the set of calculated bicycle geometric adjustment includes, for example, stem length 202, washer height 204, seat angle 206, seat height 208, and the distance from seat tip to handlebar 210. In the embodiment shown in FIG. 2, a mountain bicycle 200 is used as an example for description, but the invention is not limited to use on mountain bikes.

Thereafter, in the Step S115, a bicycle geometry which fits the cyclist is provided according to the selected bicycle model, the bicycle frame size suitable for the rider, and the set of bicycle geometric adjustment parameters.

Figure 3:
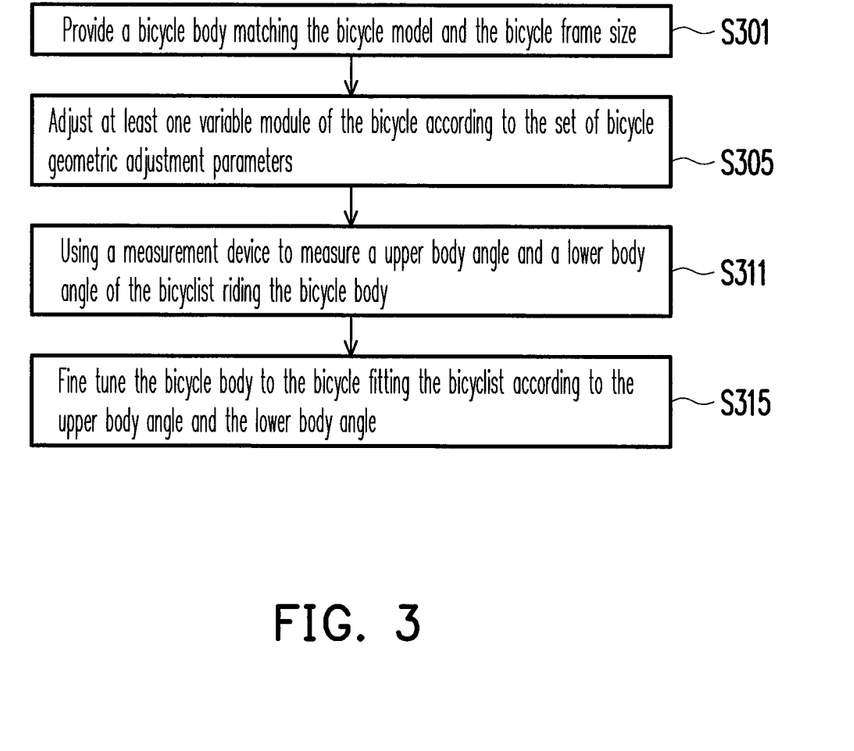
FIG. 3 is a simplified flow chart for producing a bicycle fitting a cyclist in accordance with a bicycle model, a bicycle frame size, and a set of bicycle geometric adjustment parameters according to an embodiment of the invention.

FIG. 3 is a simplified flow chart for producing a bicycle which fits the cyclist in accordance with a bicycle model, a bicycle frame size, and a set of bicycle geometric adjustment according to an embodiment of the invention. Referring to FIG. 3, in the Step S301, a bicycle body which matches a bicycle model and a bicycle frame size suitable for the rider is provided. The bicycle body is a physical bicycle or a simulation bicycle, for example.

In the Step S305, at least one variable module of the bicycle is adjusted based on a set of bicycle geometric adjustment calculated from the body measurement and the bicycle frame size. The variable module includes a seat, a seat post, a seat tube, a crank, a stem, washeres and a handlebar.

Figure 3A:
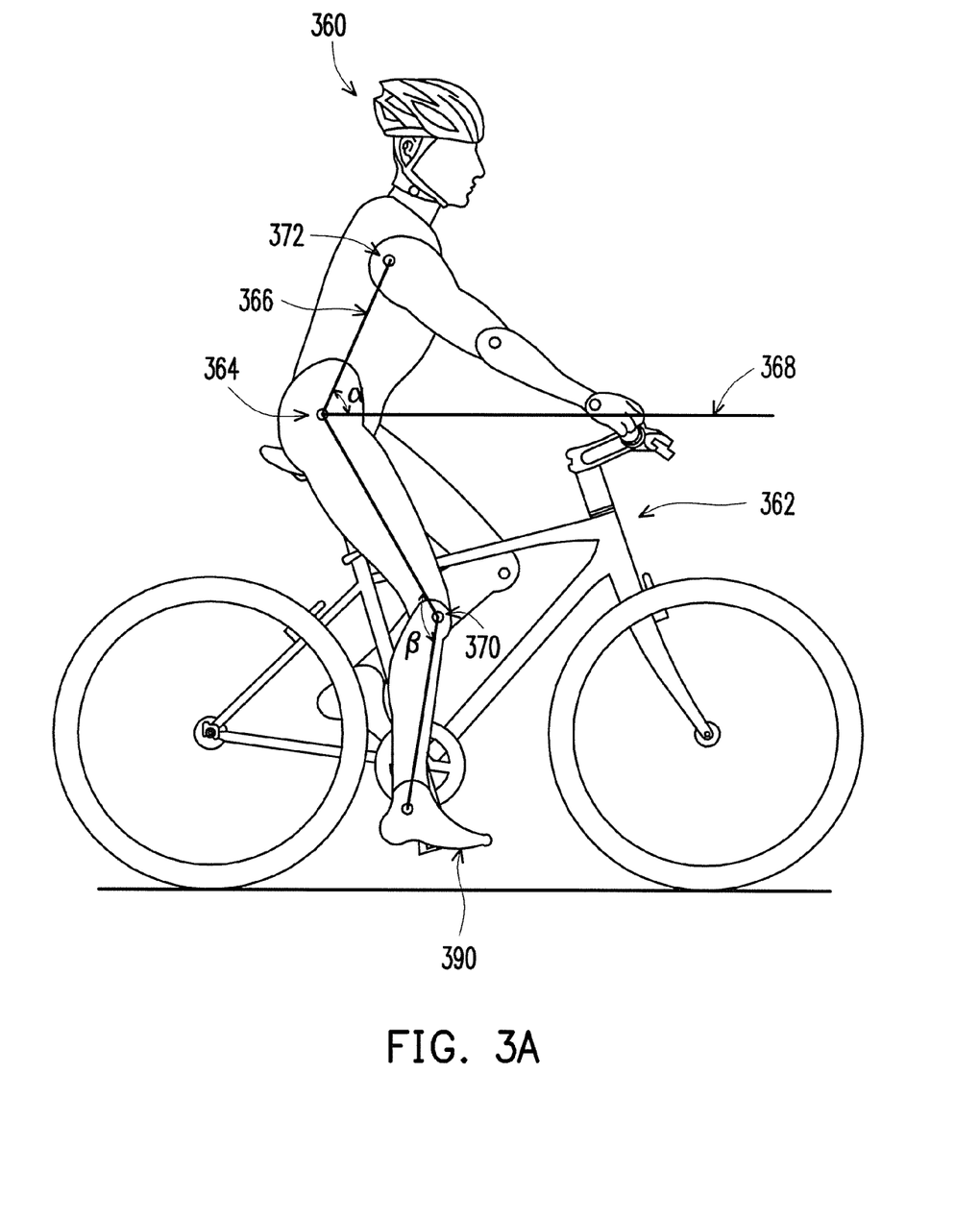
FIG. 3A is a schematic view of a upper body angle and a lower body angle of the cyclist riding on the bicycle body.

Next, in the Step 311, a measure device is used to measure a upper body angle and a lower body angle of the cyclist riding on the bicycle body. FIG. 3A is a schematic view of a upper body angle and a lower body angle of the cyclist riding on the bicycle body. Referring to FIG. 3A, a method of measuring a upper body angle of a cyclist 360 riding on the bicycle body 362 could be a goniometer to measure the angle α between a line 366 formed by an acromion process 372 to the greater trochanter 364 and a horizontal line 368, and the greater trochanter 364 is used as a reference point. Moreover, a method of measuring the lower body angle of the cyclist 360 riding on the bicycle body 362 could be the angle β between a thigh and a lower leg of the cyclist 360 with a goniometer, when the cyclist 360 rides on the bicycle body 360 and the thumb ball of one foot (as thumb ball 390 shown in FIG. 3A) is aligned with a pedal axis center of the bicycle body 362, the cyclist 360 pedals down to the lowest point and keep the pedal horizontal, and the knee joint 370 of the cyclist 360 is used as a reference point. In another embodiment, a method of measuring the upper body angle and the lower body angle of the cyclist riding on the bicycle body could also be by adhering positioning points on the cyclist at specific locations, and tracking the positioning points by a tracking device, and then calculate the torso angles of the cyclist riding on the bicycle body.

In the Step S315, the bicycle body is fine tuned to the bicycle which fits the cyclist according to the upper body angle and the lower body angle. The fine tuning of the bicycle body includes adjusting stem length, washer height, seat angle, seat height, and the distance from seat tip to handlebar on the bicycle body. Specifically, when the measured angle β between the thigh and the lower leg using the knee joint of the cyclist as the reference point in Step S311 is within the target angle range, then the seat height does not need to be adjusted. When the knee angle β is smaller than the target angle range, the seat should be raised. On the other hand, when the knee angle β is bigger than the target angle range, the seat should be lowered. Similarly, when the measured torso angle α between the line 366 formed by the acromion process 372 to the greater trochanter 364 and the horizontal line 368 using the greater trochanter 364 as the reference point in Step S311 is within the target angle range, then adjustment is not necessary. When the torso angle α is bigger than the target angle range, the stem length should be increased. On the other hand, when the torso angle α is smaller than the target angular range, the stem length should be shortened. In another embodiment, the fine tuning of the bicycle body includes adjusting a vertical height, a horizontal length, a horizontal shift position, and a handlebar height of the bicycle body. The fine tuning of the vertical height of the bicycle body includes fine tuning the bicycle frame, the seat post, and the crank. The fine tuning of the horizontal length of the bicycle body includes fine tuning the seat, the bicycle frame, the stem, and the handlebar.

Figure 4A:
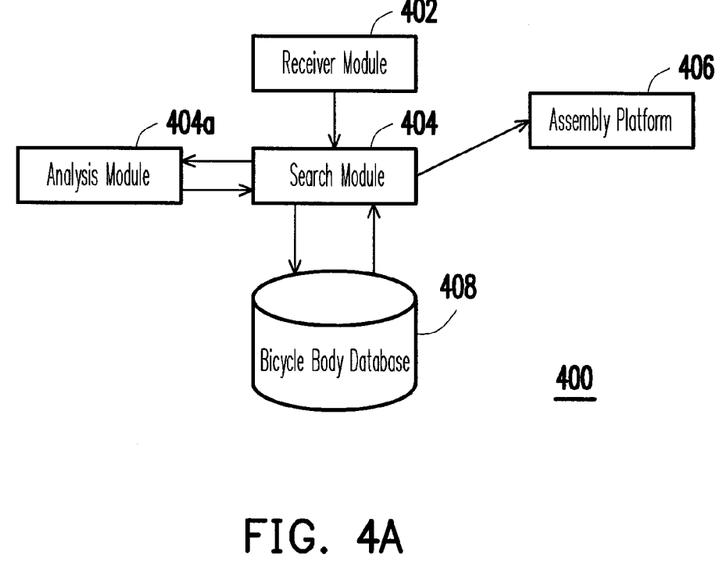
FIG. 4A is a simplified schematic diagram of a bicycle fitting system according to an embodiment of the invention.

It should be noted that, in Steps S305 and S315, the corresponding adjustment of the variable modules of the bicycle body and the fine tuning of the bicycle body could be performed by automatic device or by a manual device, and the adjustments could be also performed automatically or manually, although the invention is not limited thereto. In other words, any selected bicycle models based on the bicycle riding information of the cyclist, and the adjustment of the variable modules of the bicycle body and the fine tuning of the bicycle body are performed in accordance with a set of customized bicycle geometric adjustment calculated according to the body measurement from a cyclist, the bicycle model, and the bicycle frame size, are all within and do not depart from the spirit and scope of the invention. FIG. 4A is a simplified schematic diagram of a bicycle fitting system according to an embodiment of the invention. Referring to FIG. 4A, the bicycle fitting system 400 of the present embodiment includes a receive module 402, a search module 404, and an assembly platform 406. The receive module 402 receives a bicycle riding information and a body measurement from a cyclist.

The search module searches for a bicycle model in a bicycle body database 408 according to the received bicycle riding information. Moreover, the search module 404 searches for a recommended bicycle frame size and a set of bicycle geometric adjustment in the bicycle body database 408 according to the body measurement and the bicycle model. The search module 404 includes an analysis module 404a analyzing the bicycle riding information to determine a riding style of the cyclist. It should be noted that, the riding style includes a ride surface parameter and a riding intensity parameter. More specifically, the ride surface parameter includes an asphalt road surface condition, a sandstone road surface condition, and a mixed road surface condition. Moreover, the riding intensity parameter includes a standard level, a professional level, and a competition level. The methods in which the analysis module 404a analyzes the bicycle riding information and the methods in which the search module 404 searches for the bicycle model and the bicycle frame size and calculates a set of bicycle geometric adjustment have been described in previous embodiments, and therefore further elaboration thereof is omitted. In another embodiment, the bicycle body database 408 records a plurality of ride surface parameter-riding intensity parameter combinations, and each of the ride surface parameter-riding intensity parameter combinations corresponds to at least one bicycle model. The bicycle model could be a mountain bicycle, a road bicycle, a track bicycle, a tour bicycle, a racing bicycle, a trick bicycle, a doubles bicycle, and a female bicycle.

Figure 4B:
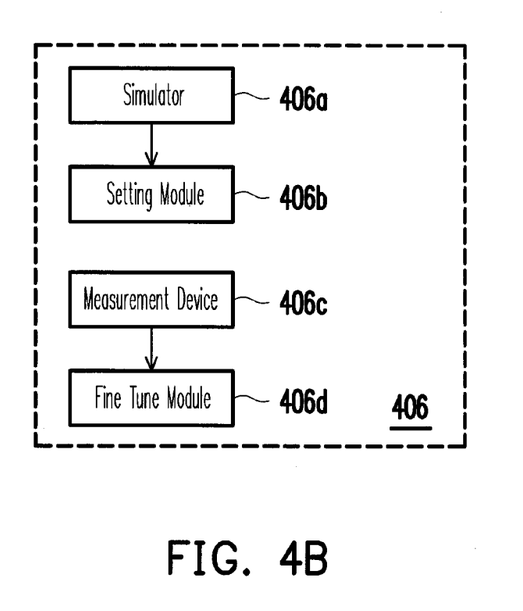
FIG. 4B is a simplified schematic diagram of a bicycle fitting system according to an embodiment of the invention.

The assembly platform 406 assembles a bicycle which fits the cyclist according to the selected bicycle model, the bicycle frame size, and the set of bicycle geometric adjustment parameters. FIG. 4B is a simplified schematic diagram of a bicycle fitting system according to an embodiment of the invention. Referring to FIG. 4B, the assembly platform 406 of the present embodiment further includes a simulator 406a, a setting module 406b, a measure device 406c, and a fine tune module 406d. The simulator 406a provides a bicycle body which matches the bicycle model and the bicycle frame size. The bicycle body could be a physical bicycle or a simulation bicycle, for example.

The setting module 406a adjusts at least one variable module of the bicycle body according to the set of calculated bicycle geometric adjustment. The variable module includes a seat, a seat post, a seat tube, a crank, a stem, washeres and a handlebar.

The measure device 406c measures a upper body angle and a lower body angle of the cyclist riding on the bicycle body. The methods of measuring the upper and lower body angles of the cyclist riding on the bicycle body have been described in the embodiments above, and therefore further elaboration thereof is omitted.

The fine tune module 406d fine tunes the bicycle body according to the measured upper body angle and the lower body angle on the bicycle which fits the cyclist. The methods of fine tuning the bicycle body according to the upper and lower body angles have also been described in the embodiments above, and therefore further elaboration thereof is omitted.

It should be noted that, in the assembly platform 406, the simulator 406a providing the bicycle body which matches the selected bicycle model and the bicycle frame size, the setting module 406b adjusting the variable modules of the bicycle body, the measure device 406c measures the torso angle of the cyclist riding on the bicycle body, and the fine tune module 406d fine tuning the bicycle body could be by a automatic devices, or by manual operation, However, the invention is not limited thereto. In other words, any selected bicycle model based on the bicycle riding information of the cyclist, and the automatic operations or the manual operations of adjusting the variable modules of the bicycle body and fine tuning of the bicycle body performed in accordance with a set of customized bicycle geometric adjustment calculated according to the body measurement of the cyclist, the bicycle model, and the bicycle frame size, are all within and do not depart from the spirit and scope of the invention.

Figure 5:
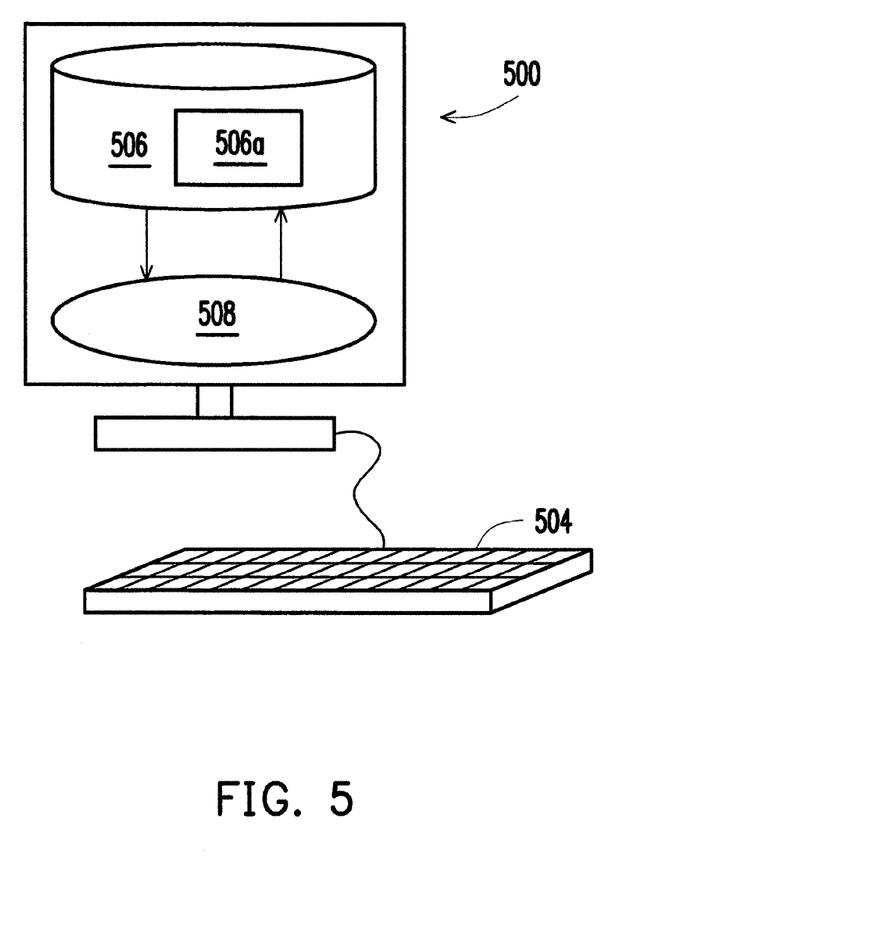
FIG. 5 is a schematic view of a bicycle fitting system according to another embodiment of the invention is shown.

Moreover, in the afore-described bicycle fitting method for producing a bicycle and the bicycle fitting system, the steps of searching for the bicycle model and the bicycle frame size and calculating a set of customized bicycle geometric adjustment according to the received bicycle riding information and the body measurement may be implemented by executing a computer program product. Specifically, referring to FIG. 5, a schematic view of a bicycle fitting system according to another embodiment of the invention is shown. A bicycle fitting system 500 of the present embodiment includes an input device 504, a storage medium 506, and a processor 508, in which the processor 508 is coupled to the input device 504. In the present embodiment, the input device 504 depicted in FIG. 5 is a physical keyboard. Nonetheless, the invention is not limited thereto. In other words, the input device 504 may be any form of device or apparatus (e.g., a virtual keyboard, a mouse, a tablet, a voice input device), in which a user can input the bicycle riding information and the body measurement of the cyclist through the input device 504 into the bicycle fitting system 500, and the processor 508 processes the inputted bicycle riding information and the body measurement.

The storage medium 506 stores a bicycle body database 506*a* and a computer program product (not drawn). The bicycle body database 506*a* is stored, for example, in the storage medium 506 of the bicycle fitting system 500 depicted in FIG. 5, although the invention is not limited thereto. In other words, the bicycle body database 506*a* may also be a database (not drawn) provided by an external manufacturer that is linked to the bicycle fitting system 500.

Specifically, the afore-described bicycle fitting method for producing a bicycle may be executed through a computer program product. When a computer/processor loads the computer program product and executes a program included in the computer program product to complete the steps of the bicycle fitting method for producing the bicycle, a bicycle model is selected in the bicycle body database according to the bicycle riding information and the body measurement of the cyclist (shown in Step S105 of FIG. 1), and a bicycle frame size is determined in the bicycle body database to calculate a set of bicycle geometric adjustment (shown in Step S111 of FIG. 1). The methods for analyzing the bicycle riding information, measuring the body size, searching for the bicycle frame size, and customizing the calculation of the bicycle geometric adjustment have been described in previous embodiments, and therefore further elaboration thereof is omitted. The afore-described computer program product may be stored in a computer readable recording medium, such as a read only memory (ROM), a random access memory, a floppy disk, a hard disk, an optical disk, a magnetic tape, a floppy disk, a hard disk, an optical disk, a portable drive, a magnetic disk, a web accessible database, or any other storage media having the same capabilities known to persons skilled in the art.

In the bicycle fitting method for producing a bicycle and the bicycle fitting system according to embodiments of the invention, a customized bicycle most suitable for the cyclist is produced by analyzing the bicycle riding information of the cyclist to determine the riding style thereof, searching in the database to find the bicycle model suitable and fitting the body measurement of the cyclist, and searching in the database to find the bicycle frame size suitable for the cyclist. Thereafter, based on the body measurement and the bicycle frame size of the cyclist, a set of bicycle geometric adjustment is calculated. According to the set of calculated bicycle geometric adjustment, the bicycle body which matches the bicycle model and the selected bicycle frame size is adjusted. Next, according to the torso angle of the cyclist riding the bicycle body, the bicycle body is fine tuned to produce the customized bicycle most suitable for the cyclist. That is to say, in embodiments of the invention, the bicycle product suitable for the cyclist can be rapidly found among a plurality of product lines or bicycle models in accordance with the bicycle riding information of the cyclist. Thereafter, according to the body measurement from the cyclist and the selected bicycle model, the bicycle frame size and the set of bicycle geometric adjustment suitable for riding by the cyclist are accurately calculated. According to the set of calculated bicycle geometric adjustment parameters and after further fine tuning, a customized bicycle suitable for the cyclist can be rapidly produced to achieve a optimal combination of the cyclist and a bicycle.

The methods described in embodiments of the invention can clearly resolve the deficiencies of the conventional bicycle fitting system, such as by providing the most suitable bicycle model according to the riding style of the cyclist to prevent the bicycle from being ridden in incorrect posture. By determining the correct bicycle frame size, the forced matching of the variable modules to adjust the target riding posture in the conventional bicycle fitting method can be solved, in which the conventional method results in lowered control sensitivity or uncoordinated whole aesthetics. Thereafter, by providing the bicycle geometric adjustment which matches the cyclist, the adjustment achieve the most optimal fitting according to the different riding intensities.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A bicycle fitting method for producing a bicycle, comprising:
    receiving a bicycle riding information and a body measurement corresponding to a cyclist;
    analyzing the bicycle riding information to define a riding style of the cyclist, wherein the riding style comprises a ride surface parameter and a riding intensity parameter, so as to select a bicycle model from at least one candidate bicycle model according to the bicycle riding information;
    providing a bicycle frame size and a set of bicycle geometric adjustment parameters according to the body measurement and the bicycle model; and
    producing a bicycle which fits the cyclist according to the bicycle model, the bicycle frame size, and the set of bicycle geometric adjustment parameters,
    wherein the step of producing the bicycle which fits the cyclist according to the bicycle model, the bicycle frame size, and the set of bicycle geometric adjustment comprises:
    providing a bicycle body which matches the bicycle model and the bicycle frame size;
    adjusting at least one variable module of the bicycle body according to the set of bicycle geometric adjustment parameters;
    measuring a upper body angle and a lower body angle of the cyclist riding on the bicycle body by using a measurement device; and
    fine tuning the bicycle body to the bicycle which fits the cyclist according to the upper body angle and the lower body angle,
    wherein the lower body angle of the cyclist riding the bicycle body is an angle between a thigh and a lower leg connected to the thigh of the cyclist, when the cyclist rides on the bicycle body and a thumb ball of one foot is aligned with a pedal axis center of the bicycle body, the cyclist pedals down to a lowest position, keeps a pedal horizontal, and a knee joint of the cyclist is used as a reference point.

2. The bicycle fitting method as claimed in claim 1, wherein the bicycle riding information comprises a ride frequency, a ride distance, and a ride duration.

3. The bicycle fitting method as claimed in claim 1, wherein the ride surface parameter comprises an asphalt road surface condition, a sandstone road surface condition, and a mixed road surface condition.

4. The bicycle fitting method as claimed in claim 1, wherein the riding intensity parameter comprises a standard level, a professional level, and a competition level.

5. The bicycle fitting method as claimed in claim 1, wherein the body measurement comprises at least one crotch inseam height and a body height.

6. The bicycle fitting method as claimed in claim 1, wherein the at least one variable module comprises a seat, a seat post, a seat tube, a crank, a stem, washeres and handlebar.

7. The bicycle fitting method as claimed in claim 1, wherein fine tuning the bicycle body comprises adjusting stem length, washer height, seat angle, seat height, and a distance from seat tip to handlebar on the bicycle body.

8. The bicycle fitting method as claimed in claim 1, wherein the upper body angle of the cyclist riding on the bicycle body is an angle between a line formed by an acromion process to a greater trochanter of the cyclist and a horizontal line, and the greater trochanter is used as a reference point.

9. A bicycle fitting system, comprising:
 a receive module receiving a bicycle riding information and a body measurement corresponding to a cyclist;
 a search module comprising an analysis module to analyze the bicycle riding information to define a riding style of the cyclist, wherein the riding style comprises a ride surface parameter and a riding intensity parameter, so as to search for a bicycle model from at least one candidate bicycle model in a bicycle body database according to the bicycle riding information, and the search module searches for a proper bicycle frame size and a set of bicycle geometric adjustment parameters in the bicycle body database according to the body measurement and the bicycle model; and
 an assembly platform assembling a bicycle fitting the cyclist according to the bicycle model, the bicycle frame size, and the set of bicycle geometric adjustment parameters,
 wherein the assembly platform further comprises:
 a simulator providing a bicycle body which matches the bicycle model and the bicycle frame size;
 a setting module adjusting at least one variable module of the bicycle body according to the set of bicycle geometric adjustment;
 a measure device measuring a upper body angle and a lower body angle of the cyclist riding the bicycle body; and
 a fine tune module fine tuning the bicycle body to a bicycle which fits the cyclist according to the upper body angle and the lower body angle,
 wherein the lower body angle of the cyclist riding the bicycle body is an angle between a thigh and a lower leg connected to the thigh of the cyclist, when the cyclist rides on the bicycle body and a thumb ball of one foot is aligned with a pedal axis center of the bicycle body, the cyclist pedals down to a lowest position, keeps a pedal horizontal, and a knee joint of the cyclist is used as a reference point.

10. The bicycle fitting system as claimed in claim 9, wherein the bicycle riding information comprises a ride frequency, a ride duration, and a ride distance.

11. The bicycle fitting system as claimed in claim 9, wherein the ride surface parameter comprises an asphalt road surface condition, a sandstone road surface condition, and a mixed road surface condition.

12. The bicycle fitting system as claimed in claim 9, wherein the riding intensity parameter comprises a standard level, a profession level, and an competition level.

13. The bicycle fitting system as claimed in claim 9, wherein the bicycle body database records a plurality of riding environment-riding intensity parameter combinations, and each of a plurality of riding environment-riding intensity parameter combinations corresponds to at least one bicycle model.

14. The bicycle fitting system as claimed in claim 9, wherein the body measurement comprises at least a crotch inseam height and a body height.

15. The bicycle fitting system as claimed in claim 9, wherein the at least one variable module comprises a seat, a seat post, a seat tube, a crank, a stem, washeres and a handlebar.

16. The bicycle fitting system as claimed in claim 9, wherein the fine tuning the bicycle body comprises adjusting stem length, washer height, seat angle, seat height, and a distance from seat tip to handlebar on the bicycle body.

* * * * *